(12) United States Patent
Fiore et al.

(10) Patent No.: US 9,651,145 B1
(45) Date of Patent: May 16, 2017

(54) TRANSMISSION GEAR SHIFTING

(71) Applicant: GM GLOBAL TECHNOLOGY OPERATIONS LLC, Detroit, MI (US)

(72) Inventors: Brian H. Fiore, Waterford, MI (US); Matthew Pruski, Brighton, MI (US); Bryan Williams, White Lake, MI (US); Jason Mallory, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 4 days.

(21) Appl. No.: 14/941,004

(22) Filed: Nov. 13, 2015

(51) Int. Cl.
F16H 61/04 (2006.01)

(52) U.S. Cl.
CPC . F16H 61/0403 (2013.01); *F16H 2061/0462* (2013.01); *F16H 2306/14* (2013.01); *F16H 2306/24* (2013.01); *F16H 2306/48* (2013.01)

(58) Field of Classification Search
None
See application file for complete search history.

(56) References Cited

U.S. PATENT DOCUMENTS

| | | | | |
|---|---|---|---|---|
| 5,172,602 A | * | 12/1992 | Jurgens | F16H 61/0437 701/51 |
| 6,319,170 B1 | * | 11/2001 | Hubbard | B60W 30/1819 477/107 |
| 8,489,295 B2 | * | 7/2013 | Kluemper | B60W 10/115 701/60 |
| 2011/0275479 A1 | | 11/2011 | Atmaram et al. | |
| 2015/0316146 A1 | * | 11/2015 | Cho | F16H 61/02 701/55 |

* cited by examiner

*Primary Examiner* — Justin Holmes
(74) *Attorney, Agent, or Firm* — Quinn IP Law

(57) ABSTRACT

A fixed-gear transmission including a plurality of planetary gear sets and a plurality of clutches is described. A method for controlling the fixed-gear transmission includes commanding a first iteration of a skip-at-sync transmission shift and monitoring clutch slip of an oncoming holding clutch associated with the skip-at-sync transmission shift during execution of the shift, which includes monitoring synchronization of the on-coming holding clutch and a maximum clutch slip overshoot value. A progressive clutch pressure ramp rate for the oncoming holding clutch is adaptively controlled in response to the clutch synchronization of the on-coming hold clutch during execution of a subsequent iteration of the skip-at-sync transmission shift.

19 Claims, 3 Drawing Sheets

TRANSMISSION GEAR SHIFTING

TECHNICAL FIELD

The disclosure relates to a step-gear transmission device and operation thereof.

BACKGROUND

Transmission devices are employed in motorized vehicles to transfer torque from a torque generative device such as an internal combustion engine to a vehicle driveline for tractive effort in response to an operator request. Transmission devices include gear sets and clutches to transfer torque in one of a plurality of fixed gear ratios.

A shift from one gear element to another may be an upshift, i.e., a shift to a higher gear, or a downshift, i.e., a shift to a lower gear. The shift may be further defined as a power-on shift, i.e., a shift that occurs when an accelerator pedal is depressed, or a power-off shift, i.e., a shift that occurs when an accelerator pedal is released. Power-on shifts (upshifts and downshifts) may require more precise control than power-off shifts, as shifts that occur when a vehicle is accelerating may be more noticeable to a driver. Variation in clutch activation may occur between vehicles, and may also occur between shift events on a vehicle due to temperature, wear, and other factors. In one system, a variation in a clutch return spring rate of 5 kPa may effect clutch activation and an associated clutch shift feel. In present systems, developing a holding clutch ramp rate may require a time-intensive calibration effort.

SUMMARY

A fixed-gear transmission including a plurality of planetary gear sets and a plurality of clutches is described. A method for controlling the fixed-gear transmission includes commanding a first iteration of a skip-at-sync transmission shift and monitoring clutch slip of an oncoming holding clutch associated with the skip-at-sync transmission shift during execution of the shift, which includes monitoring synchronization of the on-coming holding clutch and a maximum clutch slip overshoot value. A progressive clutch pressure ramp rate for the oncoming holding clutch is adaptively controlled in response to the clutch synchronization of the on-coming hold clutch during execution of a subsequent iteration of the skip-at-sync transmission shift.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
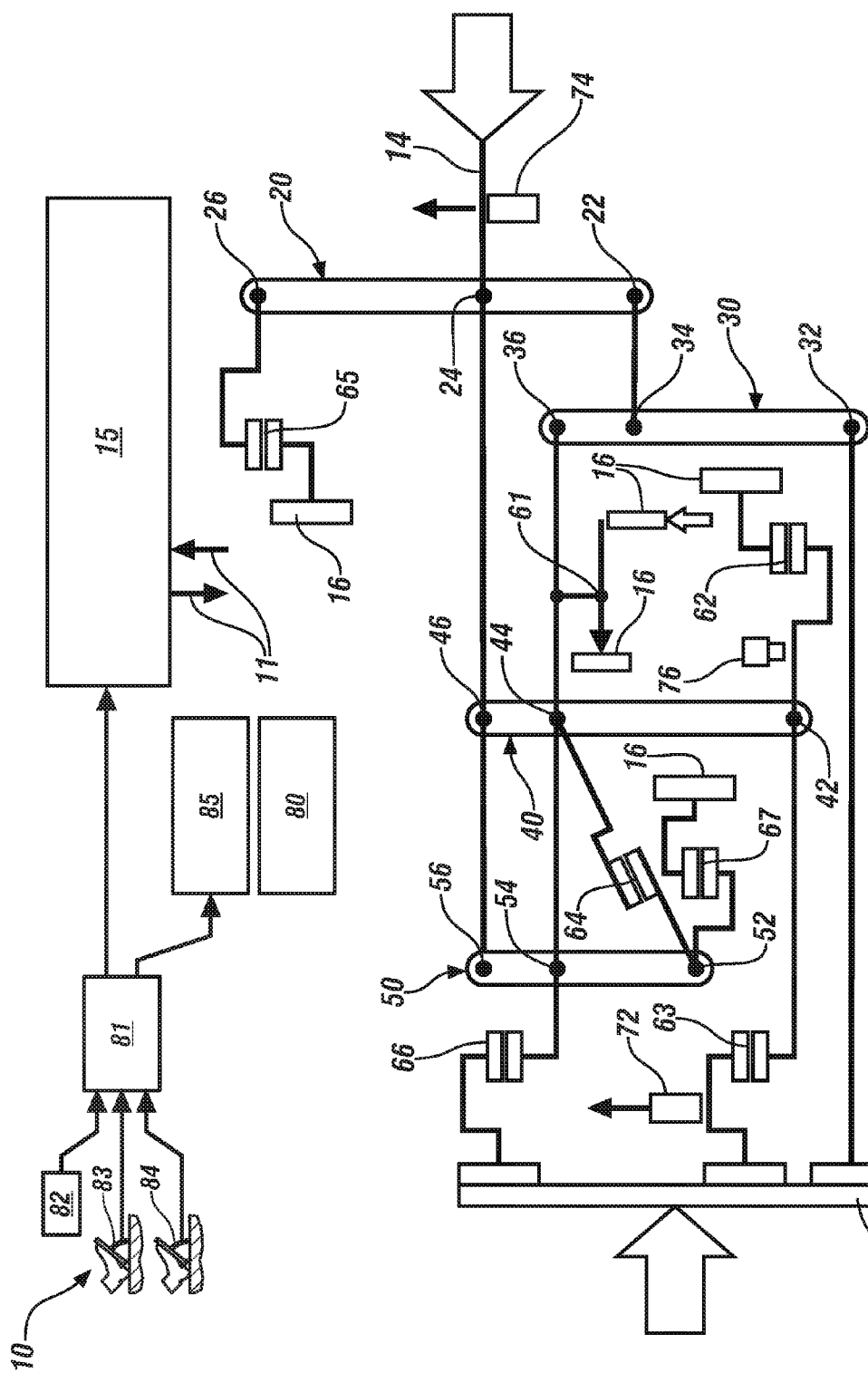
FIG. 1 schematically illustrates a lever diagram of a fixed-gear transmission and accompanying transmission controller, in accordance with the disclosure.

Referring now to the drawings, wherein the depictions are for the purpose of illustrating certain exemplary embodiments only and not for the purpose of limiting the same, FIG. 1 schematically illustrates a lever diagram of a fixed-gear transmission 10 and accompanying transmission controller 15 configured to operate in one of a plurality of fixed gear states. The transmission 10 is illustrative of one embodiment of a transmission, and provides context for the monitoring routines described with reference to FIGS. 2, 3 and 4. Other transmissions may employ the concepts described herein with similar effect.

The transmission 10 is employed to transfer torque between an input member 12 and an output member 14 of a vehicle in one embodiment, with the input member 12 rotatably coupled to a torque generator, e.g., an internal combustion engine via a torque converter, and the output member 14 rotatably coupled to a driveline to deliver tractive torque to vehicle wheels for propulsion. The transmission 10 includes a plurality of interacting planetary gears, including a first planetary gear set 20, a second planetary gear set 30, a third planetary gear set 40 and a fourth planetary gear set 50. As shown, each of the planetary gear sets is a simple planetary gear set including a sun gear, a plurality of planet gears coupled through a common carrier, and a ring gear, and each of the gears couples to a rotating member. As such, the first planetary gear set 20 includes first sun gear 22, first planet gears 24 and first ring gear 26, the second planetary gear set 30 includes second sun gear 32, second planet gears 34 and second ring gear 36, the third planetary gear set 40 includes third sun gear 42, third planet gears 44 and third ring gear 46, and the fourth planetary gear set 50 includes fourth sun gear 52, fourth planet gears 54 and fourth ring gear 56. Each of the aforementioned sun gears, planet gears and ring gears correspond to transmission rotational speed nodes. Other transmission configurations and planetary gear sets may be employed, including compound planetary gears.

In one embodiment of the transmission 10, the transmission gearing is configured as follows. The specific values are provided for purposes of illustration and are not intended to limit the concepts described herein. The first planetary gear set 20 is an output gear set having a tooth ratio of 83/37, a nominal ring/carrier gear ratio of 1.0 and a sun/carrier gear ratio of 2.24. The second planetary gear set 30 is an input gear set having a tooth ratio of 83/37, a nominal ring/carrier gear ratio of 1.0 and a sun/carrier gear ratio of 2.24. The third planetary gear set 40 is a reaction gear set having a tooth ratio of 74/25, a nominal ring/carrier gear ratio of 1.0 and a sun/carrier gear ratio of 2.96. The fourth planetary gear set 50 is an overdrive gear set having a tooth ratio of 74/46, a nominal ring/carrier gear ratio of 1.0 and a sun/carrier gear ratio of 1.607. The transmission 10 includes a plurality of controllable clutch and brake elements, including a controllable selectable one-way clutch (CB1R) 61, a first brake (CB38) 62, a first clutch (C57R) 63, a second clutch (C6789)

64, a second brake (CB123456) 65, a third clutch (C4) 66 and a third brake (CB29) 67. As used herein, the terms 'clutch' and 'brake' refer to any type of selectively activatable torque transfer device including single or compound friction plate clutches or packs, band clutches and brakes, and mechanical one-way clutches, for example. A 'clutch' rotatably couples rotation of two rotating members, and a 'brake' grounds rotation of a rotating member to a transmission case 16. A hydraulic control circuit 80 that is preferably controlled by the transmission controller 15 is operative to control activation and deactivation of the aforementioned clutches and brakes to control power flow through the transmission 10. The aforementioned clutches and brakes may also be referred to in the aggregate as 'clutches'.

The transmission 10 includes a plurality of rotational speed sensors including an input speed sensor 72 that monitors rotational position and speed of the input member 12, an output speed sensor 74 that monitors rotational position and speed of the output member 14 and one or a plurality of intermediate node speed sensor(s) 76. As shown, there is a single intermediate node speed sensor 76 monitoring rotational speed of one of the internal nodes of the transmission 10. Specifically, in this embodiment the intermediate node speed sensor 76 monitors rotational speed of the third sun gear 42. Monitored speeds from the input speed sensor 72, the output speed sensor 74 and the single intermediate node speed sensor 76 may be employed to directly and dynamically calculate a rotational speed at each of the nodes in the illustrated nine-speed transmission 10 using information related to mechanical interconnections of the transmission 10. In an alternate embodiment including a ten-speed transmission, two intermediate node speed sensors may be employed to directly calculate a rotational speed at each of the nodes of the transmission.

The transmission controller 15 communicates with a shift controller 85 and the hydraulic control circuit 80 via communication lines 11 to control operation of the transmission 10. The transmission controller 15 dynamically monitors inputs from each of the input speed sensor 72, output speed sensor 74 and the intermediate node speed sensor 76 during operation. Each of the sensors 72, 74, 76 can be any rotational sensing device capable of generating an electrically-readable signal in response to passing of a target element on the rotating member of interest, including by way of example, a Hall-effect sensor, a magnetostrictive sensor, a variable reluctance sensor or another suitable edge sensing device. The target element preferably has a plurality of equally spaced detection edges, e.g., falling edges that are indexed at equivalent magnitudes of rotation. In one embodiment, the target element has sixty (60) equally spaced falling edges that are indexed at 6° of rotation. The target element can employ other quantities of detection edges. Signal output from each of the sensors 72, 74 and 76 may indicate rotational direction, i.e., indicate a forward or a reverse direction of rotation. Application and use of rotational sensing devices is known to those skilled in the art.

Table 1 shows clutch and brake activation and power flow through the transmission 10 for the various gears, wherein the 'X' indicates activation of the respective clutch to effect operation in the indicated gear state.

TABLE 1

| Gear State | Gear Ratio | Ratio Step | CB1R | CB38 | C57R | C6789 | CB123456 | C4 | CB29 |
|---|---|---|---|---|---|---|---|---|---|
| R | -2.960 |  | X |  | X |  |  |  |  |
| N | — | -0.63 |  |  |  |  |  |  |  |
| 1 | 4.689 |  | X |  |  |  | X |  |  |
| 2 | 3.306 | 1.42 |  |  |  |  | X |  | X |
| 3 | 3.012 | 1.10 |  | X |  |  | X |  |  |
| 4 | 2.446 | 1.23 |  |  |  |  | X | X |  |
| 5 | 1.923 | 1.27 |  |  | X |  | X |  |  |
| 6 | 1.446 | 1.33 |  |  |  | X | X |  |  |
| 7 | 1.000 | 1.45 |  |  | X | X |  |  |  |
| 8 | 0.747 | 1.34 |  | X |  | X |  |  |  |
| 9 | 0.617 | 1.21 |  |  |  | X |  |  | X |

Referring again to FIG. 1, the hydraulic control circuit 80 controls various elements of the transmission 10. For purposes of the present disclosure, the hydraulic control circuit 80 controls activation and deactivation of the clutches 61-67, and includes a hydraulic pressure source that supplies hydraulic fluid at a line pressure to the hydraulic control circuit 80. The hydraulic control circuit 80 selectively supplies hydraulic fluid to the clutches 61-67 at second pressures based on pressure commands received from the shift controller 85. The second pressures may be referred to as clutch control pressures. Although not shown, the hydraulic control circuit 80 may include electromechanical actuators, such as solenoids, and hydraulic elements, such as poppet valves and check valves, for controlling the clutch control pressures. The hydraulic control circuit 80 controls the clutch control pressures by selectively supplying fluid to or discharging fluid from apply chambers of the clutches 61-67.

The transmission controller 15 controls operation of the transmission 10 based on driver inputs received from a transmission range selector 82, a brake pedal 83 and an accelerator pedal 84, which generate signals that may be conveyed either directly or via a user interface 81. The transmission range selector 82 is used by a driver to convey a desired transmission range or gear ratio of the transmission 10, and may include tap-up/tap-down shifting capability. The accelerator pedal 84 is used by the driver to convey a desired vehicle acceleration. The brake pedal 83 is used by the driver to convey a desired vehicle deceleration. The transmission controller 15 also controls operation based on vehicle inputs received from various sensors that sense one or more operating conditions of the vehicle system 10.

The transmission controller 15 communicates with the shift controller 85 to control clutch control pressures for off-going and on-coming clutches during power-on downshifts, i.e., downshifts that occur when the accelerator pedal 84 is depressed. The shift controller 85 controls the clutch control pressures by outputting timed control signals to the hydraulic control circuit 80 indicating desired clutch control pressures. The shift controller 85 controls the clutch control pressures based on operating conditions, which may include input or turbine speed, compensated input torque, transmission temperature, ambient pressure, gear slip, and vehicle speed. The shift controller 85 may control clutch control pressures in response to the operator inputs to the transmission range selector 82, the accelerator pedal 84, and the brake pedal 83. The shift controller 85 also controls engine output torque based on the inputs received from the aforementioned sensors.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals or loops, for example each 6.25 ms, 12.5 ms, 25 ms or 100 ms during ongoing operation. Alternatively, routines may be executed in response to occurrence of a triggering event. Communication between controllers, and communication between controllers, actuators and/or sensors may be accomplished using a direct wired link, a networked communication bus link, a wireless link or any another suitable communication link, and is indicated by communication lines 11. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Turbine or input speed is a rotational speed of a turbine of a torque converter that rotatably couples to the transmission input member 12. The turbine speed may be determined using various methods. As one example, the turbine speed may be determined based on a rotational speed of the transmission input member 12, employing the input speed sensor 72.

Transmission temperature is an estimate of the temperature of the fluid within the apply chambers of the clutches. The transmission temperature may be determined using various methods. As one example, the transmission temperature may be determined based on a temperature of the fluid supplied by the hydraulic pressure source. A transmission fluid temperature sensor may sense the temperature of the fluid.

Ambient air pressure is the absolute pressure of the ambient air. The ambient pressure may be measured directly by a sensor that senses the ambient pressure. Alternately, the ambient pressure may be estimated based on one or more measured engine operating conditions, including a mass air flow (MAF), a manifold air pressure (MAP), and a throttle position. The MAF, the MAP, and the throttle position may be sensed by one or more sensors located in an engine air intake system.

Gear slip is a difference between an estimated output shaft speed and a measured output shaft speed. Gear slip may also be a difference between an estimated turbine speed at a commanded gear ratio and a measured turbine speed. Positive gear slip occurs when the measured turbine speed is greater than the estimated turbine speed. The estimated turbine speed at the commanded gear ratio may be calculated by multiplying a rotational speed of the output member 14 by the commanded gear ratio. The output speed sensor 74 may measure the rotational speed of the output member 14.

Vehicle speed is the linear speed of the vehicle system in relation to ground. The vehicle speed may be determined based on a rotational speed of the wheels. A wheel speed sensor may be configured to measure the rotational speed of the wheels.

The shift controller 85 may execute a power-on downshift when a pedal position sensor indicates that the driver has stepped into the accelerator pedal 84, thus requesting acceleration of the vehicle. The shift controller 85 may start a first power-on downshift when the driver initially depresses the accelerator pedal 84, and may start a second power-on downshift when the driver further depresses the accelerator pedal 84. When this occurs, the shift controller 85 starts the second power-on downshift before the first power-on downshift is completed. Consecutive downshifts may also be executed when the driver significantly depresses the accelerator pedal 84 to rapidly accelerate the vehicle. A consecutive downshift may result in a prohibited shift event, wherein all the off-going clutches are released prior to applying any on-coming clutches during the shift. Operation with all clutches released may result in uncontrolled operation of the transmission with attendant risk of harm thereto.

One method for shifting an automatic step-gear transmission in a manner that avoids occurrence of a prohibited shift event is referred to herein as a skip-at-sync downshift. A skip-at-sync downshift is a consecutive downshift that includes initiating a second downshift before a first downshift ends. In a skip-at-sync downshift, the second downshift is initiated at or before the input speed reaches synchronization, allowing the transmission to skip from a first downshift to the second downshift when the input speed matches the target input speed for the commanded gear ratio associated with the first downshift.

Figure 2:
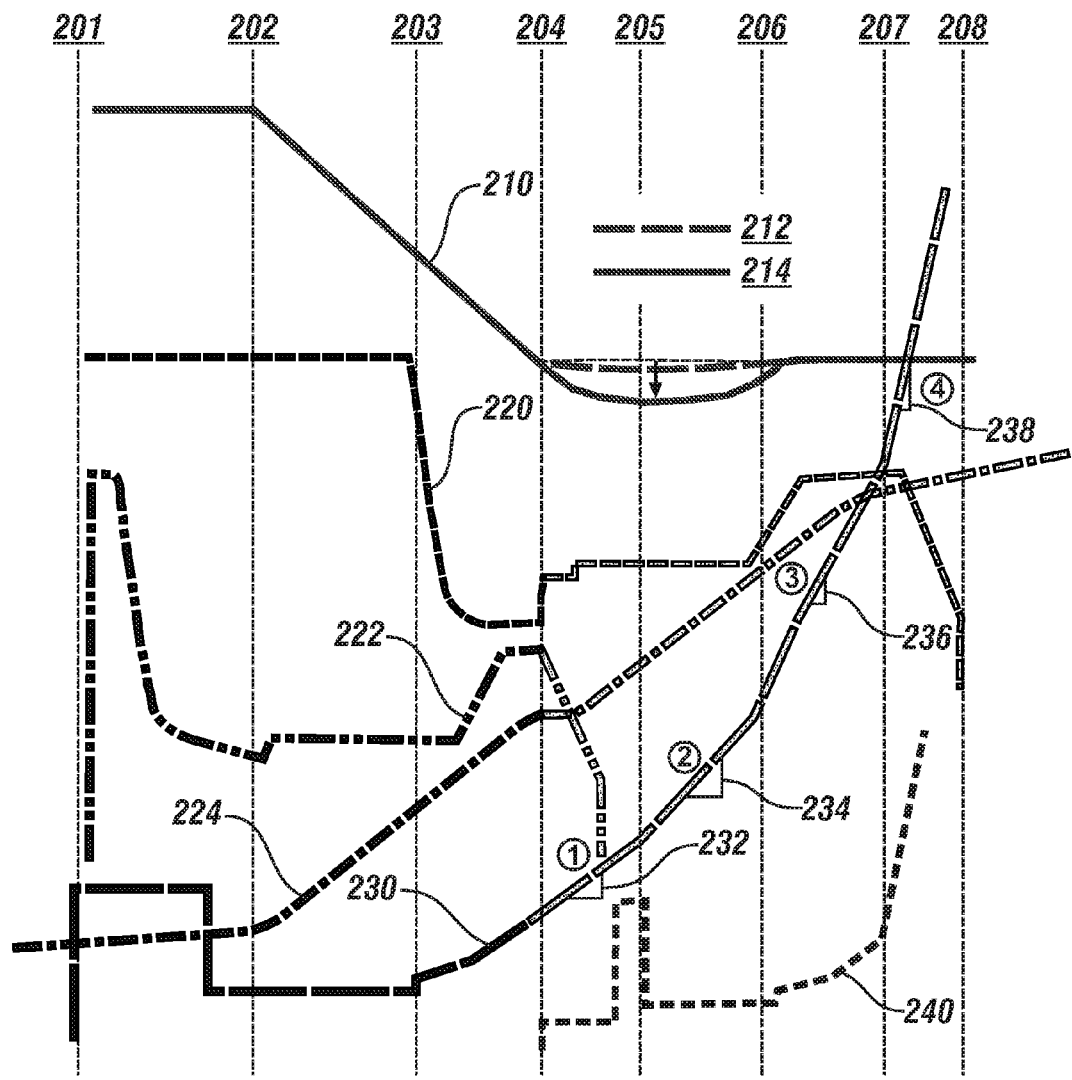
FIG. 2 graphically shows clutch pressures and transmission speeds associated with executing a portion of a skip-at-sync transmission downshift that includes a first power-on downshift and a second power-on downshift, in accordance with the disclosure.

FIG. 2 graphically shows clutch pressures and transmission speeds associated with executing a portion of a skip-at-sync transmission downshift that includes a first power-on downshift and a second power-on downshift, all of which is shown in relation to time on the horizontal axis. This operation is advantageously employed on embodiments of fixed-gear transmission systems employing a plurality of planetary gear sets, e.g., an embodiment of the nine-speed transmission 10 employing four planetary gear sets described with reference to FIG. 1. The first power-on downshift is shown occurring between timepoints 201 and 204, and the second power-on downshift is shown occurring between timepoints 204 and 208. The shift controller 85 starts the second power-on downshift at or before synchronization of the first power-on downshift. Synchronization of the first power-on downshift occurs when the measured turbine speed is equal to the estimated turbine speed at the commanded gear ratio of the first power-on downshift. In this manner, the shift controller 85 executes a skip-at-sync downshift.

Transmission values of interest during the illustrated skip-at-sync transmission downshift include clutch slip 210 for an on-coming holding clutch, an associated on-coming holding clutch pressure command 230, an off-going holding clutch pressure 220, a primary off-going holding clutch pressure 222, a primary on-coming holding clutch pressure 240, and transmission input speed 224. The clutch slip 210 includes an ideal clutch slip 212 and an actual clutch slip 214.

The primary off-going holding clutch pressure 222 is associated with a first off-going clutch that is being deactivated during the first downshift in the skip-at-sync transmission downshift. The off-going holding clutch pressure 220 is associated with a second, holding clutch that is being deactivated during the first downshift in the skip-at-sync transmission downshift, and begins to reduce at timepoint 203. The primary on-coming holding clutch pressure 240 is associated with a first on-coming clutch that is being activated during the second downshift in the skip-at-sync transmission downshift. The on-coming holding clutch pressure command 230 is associated with a second, holding clutch that is being activated during the second downshift in the skip-at-sync transmission downshift. The on-coming holding clutch pressure command 230 is controlled responsive to a progressive clutch pressure ramp rate, which includes a plurality of progressively increasing clutch pressure rates that may be adaptively controlled in response to clutch slip speed, which is shown as line 210, and begins to decrease at timepoint 202 responsive to reduction of the off-going holding clutch pressure 222. One embodiment of a progressive clutch pressure ramp rate is indicated as a portion of the on-coming holding clutch pressure command 230, and includes a first pressure ramp rate $\Delta P_1/\Delta t$ 232 commanded between timepoints 204 and 205, a second pressure ramp rate $\Delta P_2/\Delta t$ 234 commanded between timepoints 205 and 206, a third pressure ramp rate $\Delta P_3/\Delta t$ 236 commanded between timepoints 206 and 207, and a fourth pressure ramp rate $\Delta P_4/\Delta t$ 238 commanded between timepoints 207 and 208.

The shift controller 85 commands the hydraulic control circuit 80 to adaptively control clutch control pressure of the on-coming holding clutch at predetermined ramp rates in a feed-forward manner during its activation. The pressure ramp rates $\Delta P_1/\Delta t$ 232, $\Delta P_2/\Delta t$ 234, $\Delta P_3/\Delta t$ 236 and $\Delta P_4/\Delta t$ 238 progressively increase in magnitude. The pressure ramp rates $\Delta P_1/\Delta t$ 232, $\Delta P_2/\Delta t$ 234, $\Delta P_3/\Delta t$ 236 and $\Delta P_4/\Delta t$ 238 may be adaptively controllable during activation of the on-coming holding clutch to manage clutch slip of the on-coming holding clutch, including managing overshoot in certain embodiments. In certain embodiments, only the pressure ramp rates $\Delta P_1/\Delta t$ 232, $\Delta P_2/\Delta t$ 234 of the on-coming holding clutch pressure command 230 are adaptively controlled during activation of the on-coming holding clutch. On-coming holding clutch overshoot is described in detail with reference to FIG. 4. Excessive clutch slip overshoot may result in shift harshness or overlong shift duration.

Figure 3:
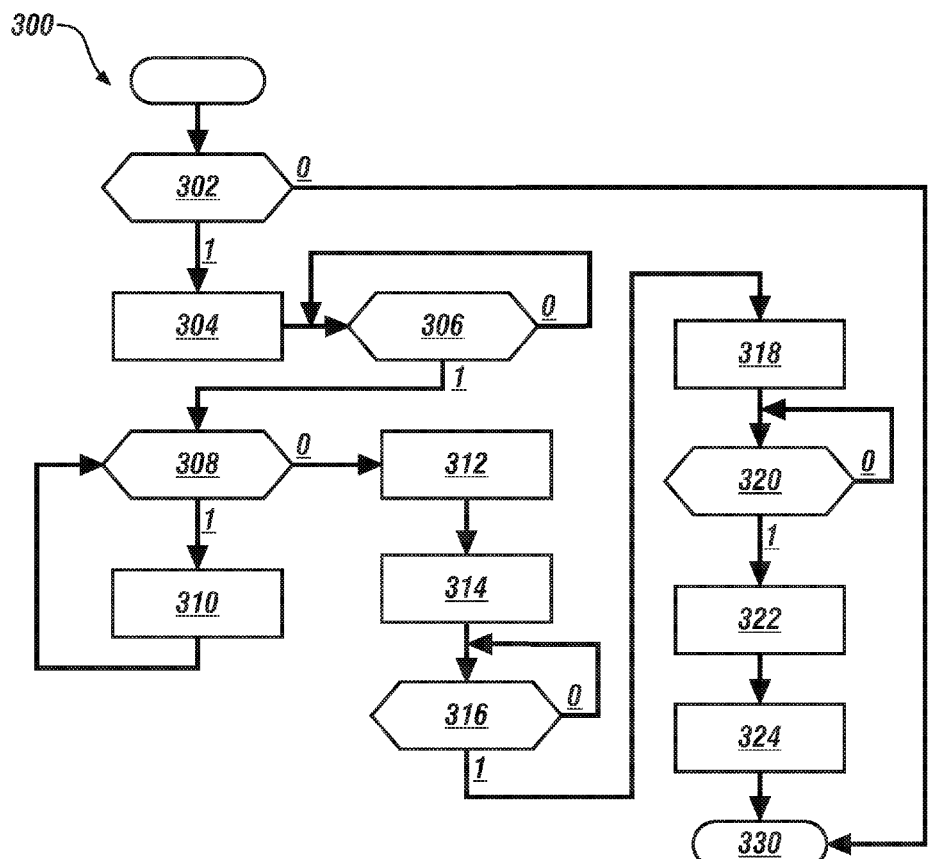
FIG. 3 schematically shows a clutch slip overshoot control routine that includes a process for determining and controlling clutch slip overshoot for one of the clutches during activation, in accordance with the disclosure.

FIG. 3 schematically shows a clutch slip overshoot control routine (routine) 300 that includes a process for determining and controlling clutch slip overshoot for one of the clutches during activation. The clutch slip overshoot may be employed to adaptively control one or more of the first ramp rate $\Delta P_1/\Delta t$ 232, the second ramp rate $\Delta P_2/\Delta t$ 234, the third ramp rate $\Delta P_3/\Delta t$ 236, and the fourth ramp rate $\Delta P_4/\Delta t$ 238 during successive iterations of skip-at-sync shifts for an on-coming holding clutch during activation. The routine 300 may be advantageously employed on embodiments of fixed-gear transmission systems employing a plurality of planetary gear sets, e.g., an embodiment of the nine-speed transmission 10 employing four planetary gear sets described with reference to FIG. 1. The concepts of the routine 300 can be adapted for implementation with any fixed gear transmission. Table 3 is provided as a key wherein the numerically labeled blocks and the corresponding functions are set forth as follows.

TABLE 3

| BLOCK | BLOCK CONTENTS |
| --- | --- |
| 302 | Is skip-at-sync shift active? |
| 304 | Monitor clutch slip on on-coming clutch designated as a holding clutch |
| 306 | Did clutch slip value cross zero? |
| 308 | Is clutch slip overshoot greater than clutch slip overshoot from previous loop? |
| 310 | Capture current maximum clutch slip overshoot value |
| 312 | Capture stored value from last loop as new maximum clutch slip overshoot |
| 314 | Monitor clutch slip on on-coming clutch designated as holding clutch |
| 316 | Is clutch slip less than calibrated value? |
| 318 | Capture shift progression ratio |
| 320 | Monitor clutch synchronization |
| 322 | Evaluate the elapsed time for the on-coming clutch to synchronize and the maximum clutch slip overshoot value |
| 324 | Update progressive clutch pressure ramp rate |
| 330 | End iteration |

The routine 300 initiates execution when a skip-at-sync transmission shift is indicated by the shift controller 85 (302). This includes monitoring clutch slip on the on-coming clutch that is designated or otherwise indicated as being a holding clutch (304). Monitoring clutch slip may be accomplished by monitoring signal inputs from the rotational speed sensors, e.g., the input speed sensor 72 that monitors rotational position and speed of the input member 12, output speed sensor 74 that monitors rotational position and speed of the output member 14 and one or a plurality of intermediate node speed sensor(s) 76, and evaluating their outputs in relation to expected speeds for the present transmission gear state. Clutch slip associated with an on-coming holding clutch is shown in FIG. 2 as line 210 and is also shown in detail with reference to FIG. 4.

Figure 4:
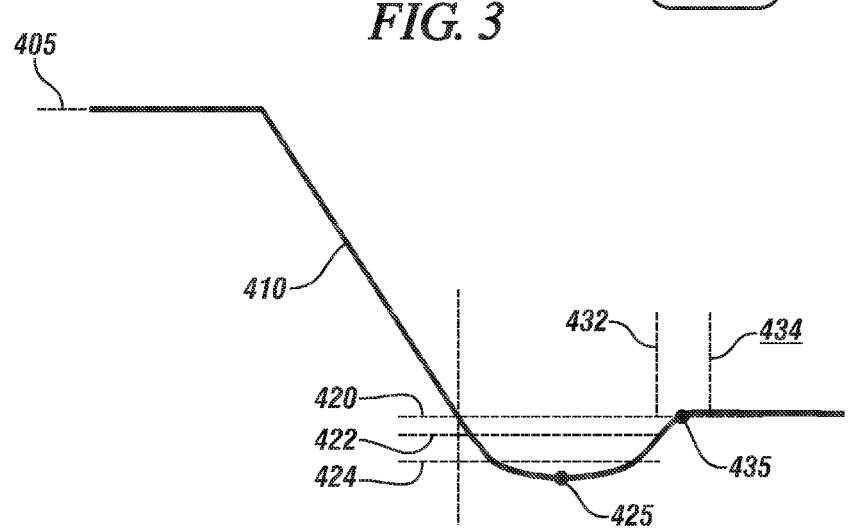
FIG. 4 graphically shows representative clutch slip data illustrating clutch slip for an on-coming holding clutch, including a zero slip line indicating clutch synchronization, a minimum preferred clutch slip and a maximum preferred clutch slip, in accordance with the disclosure.

FIG. 4 graphically shows representative clutch slip data 410 illustrating clutch slip for an on-coming holding clutch. Clutch slip is shown on the vertical axis, and includes a zero slip line 405 indicating clutch synchronization, a minimum preferred clutch slip 422, and a maximum preferred clutch slip 424. A maximum clutch overshoot 425 is also indicated for the representative clutch slip data 410, which overshoots the maximum preferred clutch slip 424 as shown. A clutch synchronization time 435, an associated preferred minimum synchronization ratio 432 and a preferred maximum synchronization ratio 434 are also indicated.

Referring again to FIG. 3, the routine 300 determines whether the clutch slip has overshot or crossed a zero line, i.e., whether the clutch slip has traversed from a positive slip value to a negative clutch slip value (306). If not (306)(0), the routine 300 continues monitoring operation. If the clutch slip has crossed the zero line, e.g., as shown by the intersection of line 410 at line 420 in FIG. 4, (306)(1), indicating overshoot, the routine 300 determines the magnitude of the maximum clutch overshoot by determining whether the clutch slip overshoot is greater than clutch slip overshoot from a previous loop (308)(0), and capturing the previous clutch slip overshoot value (310) as the maximum clutch slip overshoot value (312) when there is a decrease in the clutch slip overshoot from a previous loop (308)(1). The clutch slip of the on-coming holding clutch continues to be monitored (314) until the clutch slip is less than a calibrated value (316)(0), (316)(1), at which time the present shift progression ratio is captured and stored (318) and synchronization of the on-coming clutch is monitored (320).

The routine 300 evaluates the elapsed time for the on-coming clutch to synchronize and the maximum clutch slip overshoot value (322) and updates the progressive clutch pressure ramp rate based thereon, as follows (324). This permits the routine to adaptively control the progressive clutch pressure ramp rate for the oncoming holding clutch during execution of a subsequent iteration of the skip-at-sync transmission shift in response to the monitored clutch slip of the on-coming holding clutch.

The step of updating the progressive clutch pressure ramp rate based upon the elapsed time for the on-coming clutch to synchronize and the maximum clutch slip overshoot value (324) is best described with reference to FIG. 4, as follows. When the clutch synchronization occurs at a progression ratio less than the minimum synchronization ratio 432 and the maximum clutch slip overshoot value 425 is less than the maximum preferred clutch slip 424, the pressure ramp rates, e.g., $\Delta P_1/\Delta t$ 232, $\Delta P_2/\Delta t$ 234 of the on-coming holding clutch pressure command 230 shown with reference to FIG. 2, are adaptively decreased.

When the clutch synchronization occurs at any progression ratio when the maximum clutch slip overshoot value is greater than the maximum preferred clutch slip 424, the pressure ramp rates are increased.

When the clutch synchronization occurs at a progression ratio that is greater than the maximum synchronization ratio 434 and the maximum clutch slip overshoot value is any value, the pressure ramp rates are increased.

When the clutch synchronization occurs at a progression ratio that is between the minimum synchronization ratio 432 and the maximum synchronization ratio 434 and the maximum clutch slip overshoot value is greater than the maximum preferred clutch slip 424, the pressure ramp rates are increased.

When the clutch synchronization occurs at a progression ratio that is between the minimum synchronization ratio 432 and the maximum synchronization ratio 434 and the maximum clutch slip overshoot value is less than the minimum preferred clutch slip 422, the pressure ramp rates are decreased.

When the clutch synchronization occurs at a progression ratio that is between the minimum synchronization ratio 432 and the maximum synchronization ratio 434 and the maximum clutch slip overshoot value is between the minimum preferred clutch slip 422 and the maximum preferred clutch slip 424, no action is taken.

This operation permits the routine to adaptively control the progressive clutch pressure ramp rate for the oncoming holding clutch during execution of a subsequent iteration of the skip-at-sync transmission shift in response to the monitored clutch slip of the holding clutch.

In one embodiment, the routine 300 may be executed each 6.25 ms loop, and nominal values for the pressure ramp rates may include $\Delta P_1/\Delta t=3$ kPa/loop, $\Delta P_2/\Delta t=6$ kPa/loop, with $\Delta P_3/\Delta t$ 236 and $\Delta P_4/\Delta t$ 238 having progressively increasing pressure ramp rates. The adaptive control may include, in one embodiment, increasing or decreasing one of the nominal values for the pressure ramp rates by a value of 1.0 kPa per loop. In one embodiment, the updated pressure ramp rates may be stored in one of the non-volatile memory devices for use during successive vehicle key-on cycles.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a fixed-gear transmission including a plurality of interconnected planetary gear sets and a plurality of clutches, the method comprising:
commanding a first iteration of a skip-at-sync transmission shift;
monitoring clutch slip of an oncoming holding clutch associated with the skip-at-sync transmission shift during execution of the first iteration of the skip-at-sync transmission shift, including monitoring clutch synchronization and a maximum clutch slip overshoot value; and
adaptively controlling a progressive clutch pressure ramp rate for the oncoming holding clutch in response to the monitored clutch slip of the holding clutch during execution of a subsequent iteration of the skip-at-sync transmission shift.

2. The method of claim 1, wherein adaptively controlling the progressive clutch pressure ramp rate for the oncoming holding clutch in response to the monitored clutch slip of the holding clutch comprises decreasing the progressive clutch pressure ramp rate when the clutch synchronization occurs at a progression ratio that is less than a minimum synchronization ratio and the maximum clutch slip overshoot value is less than a minimum preferred clutch slip.

3. The method of claim 1, wherein adaptively controlling the progressive clutch pressure ramp rate for the oncoming holding clutch in response to the monitored clutch slip of the holding clutch comprises decreasing the progressive clutch pressure ramp rate when the clutch synchronization occurs at a progression ratio that is less than a minimum synchronization ratio and the maximum clutch slip overshoot value is less than a maximum preferred clutch slip.

4. The method of claim 1, wherein adaptively controlling the progressive clutch pressure ramp rate for the oncoming holding clutch in response to the monitored clutch slip of the holding clutch comprises increasing the progressive clutch pressure ramp rate when the clutch synchronization occurs at a progression ratio that is less than a minimum synchronization ratio and the maximum clutch slip overshoot value is greater than a maximum preferred clutch slip.

5. The method of claim 1, wherein adaptively controlling the progressive clutch pressure ramp rate for the oncoming holding clutch in response to the monitored clutch slip of the holding clutch comprises decreasing the progressive clutch pressure ramp rate when the clutch synchronization occurs at a progression ratio that is less than a maximum synchronization time and the maximum clutch slip overshoot value is less than a minimum preferred clutch slip.

6. The method of claim 1, wherein adaptively controlling the progressive clutch pressure ramp rate for the oncoming holding clutch in response to the monitored clutch slip of the holding clutch comprises increasing the progressive clutch pressure ramp rate when the clutch synchronization occurs at a progression ratio that is less than a maximum synchronization ratio and the maximum clutch slip overshoot value is less than a maximum preferred clutch slip.

7. The method of claim 1, wherein adaptively controlling the progressive clutch pressure ramp rate for the oncoming holding clutch in response to the monitored clutch slip of the holding clutch comprises maintaining the progressive clutch pressure ramp rate when the clutch synchronization occurs at a progression ratio that is less than a maximum synchronization ratio and the maximum clutch slip overshoot value is less than a maximum preferred clutch slip.

8. The method of claim 1, wherein adaptively controlling the progressive clutch pressure ramp rate for the oncoming holding clutch in response to the monitored clutch slip of the holding clutch comprises increasing the progressive clutch pressure ramp rate when the clutch synchronization occurs at a progression ratio that is greater than a maximum synchronization ratio.

9. The method of claim 1, wherein monitoring clutch slip of the oncoming holding clutch comprises dynamically monitoring, via rotational speed sensors, a transmission input speed, an intermediate node speed and a transmission output speed.

10. The method of claim 1, wherein the progressive clutch pressure ramp rate for the oncoming holding clutch comprises a plurality of progressively increasing clutch pressure rates.

11. The method of claim 10, comprising adaptively controlling the plurality of progressively increasing clutch pressure rates for the oncoming holding clutch in response to the monitored clutch slip of the holding clutch during execution of a subsequent iteration of the skip-at-sync transmission shift.

12. A fixed-gear transmission configured to transfer torque between an input member and an output member, comprising:

a plurality of planetary gear sets and a plurality of clutches, wherein the planetary gear sets are rotatably coupled by selective activation of the clutches;

a hydraulic control circuit configured to control activation of the clutches;

a plurality of rotational speed sensors including an input speed sensor monitoring the input member, an output speed sensor monitoring the output member, and an intermediate node speed sensor monitoring an internal node of the transmission;

a transmission controller communicating with a shift controller, the plurality of rotational speed sensors and the hydraulic control circuit;

wherein the transmission controller dynamically monitors inputs from the input speed sensor, the output speed sensor and the intermediate node speed sensor;

the transmission controller including an instruction set, the instruction set executable to:
 command a first iteration of a skip-at-sync transmission shift,
 monitor the rotational speed sensors to determine clutch slip of an oncoming holding clutch associated with the skip-at-sync transmission shift during execution of the first iteration of the skip-at-sync transmission shift, including monitoring clutch synchronization and a maximum clutch slip overshoot value, and
 adaptively control the hydraulic control circuit to achieve a progressive clutch pressure ramp rate for the oncoming holding clutch in response to the monitored clutch slip of the holding clutch during execution of a subsequent iteration of the skip-at-sync transmission shift.

13. The transmission of claim 12, wherein the adaptive control of the hydraulic control circuit to achieve the progressive clutch pressure ramp rate for the oncoming holding clutch in response to the monitored clutch slip of the holding clutch comprises decreasing the progressive clutch pressure ramp rate when the clutch synchronization occurs at a progression ratio that is less than a minimum synchronization ratio and the maximum clutch slip overshoot value is less than a minimum preferred clutch slip.

14. The transmission of claim 12, wherein the adaptive control of the hydraulic control circuit to achieve the progressive clutch pressure ramp rate for the oncoming holding clutch in response to the monitored clutch slip of the holding clutch comprises decreasing the progressive clutch pressure ramp rate when the clutch synchronization occurs at a progression ratio that is less than a minimum synchronization ratio and the maximum clutch slip overshoot value is less than a maximum preferred clutch slip.

15. The transmission of claim 12, wherein the adaptive control of the hydraulic control circuit to achieve the progressive clutch pressure ramp rate for the oncoming holding clutch in response to the monitored clutch slip of the holding clutch comprises increasing the progressive clutch pressure ramp rate when the clutch synchronization occurs at a progression ratio that is less than a minimum synchronization ratio and the maximum clutch slip overshoot value is greater than a maximum preferred clutch slip.

16. The transmission of claim 12, wherein the adaptive control of the hydraulic control circuit to achieve the progressive clutch pressure ramp rate for the oncoming holding clutch in response to the monitored clutch slip of the holding clutch comprises decreasing the progressive clutch pressure ramp rate when the clutch synchronization occurs at a progression ratio that is less than a maximum synchronization time and the maximum clutch slip overshoot value is less than a minimum preferred clutch slip.

17. The transmission of claim 12, wherein the adaptive control of the hydraulic control circuit to achieve the progressive clutch pressure ramp rate for the oncoming holding clutch in response to the monitored clutch slip of the holding clutch comprises increasing the progressive clutch pressure ramp rate when the clutch synchronization occurs at a progression ratio that is less than a maximum synchronization ratio and the maximum clutch slip overshoot value is less than a maximum preferred clutch slip.

18. The transmission of claim 12, wherein the adaptive control of the hydraulic control circuit to achieve the progressive clutch pressure ramp rate for the oncoming holding clutch in response to the monitored clutch slip of the holding clutch comprises maintaining the progressive clutch pressure ramp rate when the clutch synchronization occurs at a progression ratio that is less than a maximum synchronization ratio and the maximum clutch slip overshoot value is less than a maximum preferred clutch slip.

19. The transmission of claim 12, wherein the adaptive control of the hydraulic control circuit to achieve the progressive clutch pressure ramp rate for the oncoming holding clutch in response to the monitored clutch slip of the holding clutch comprises increasing the progressive clutch pressure ramp rate when the clutch synchronization occurs at a progression ratio that is greater than a maximum synchronization ratio.

* * * * *